United States Patent Office 2,923,318
Patented Feb. 2, 1960

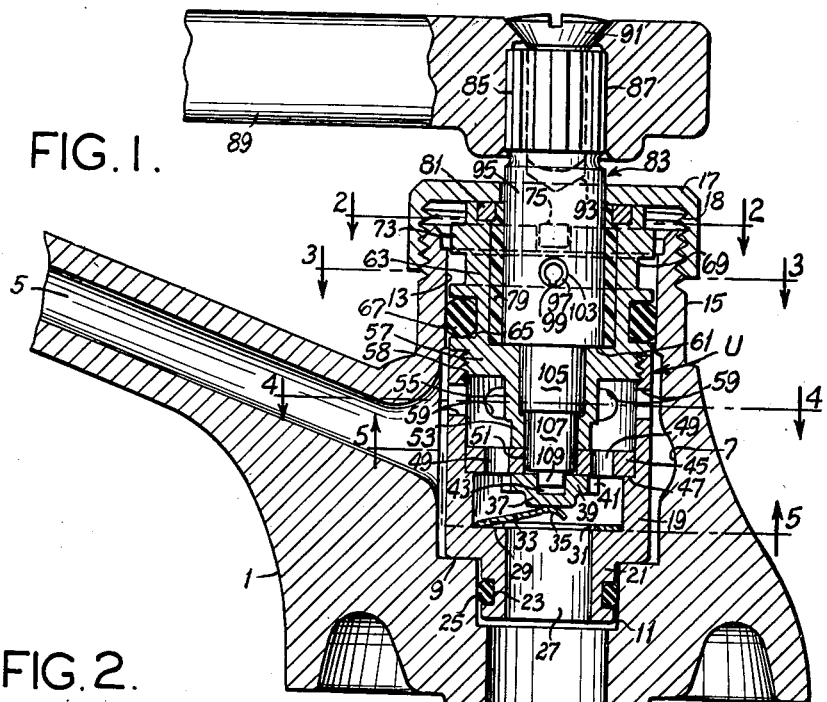

2,923,318

VALVE

Oscar P. Monson, Kenosha, Wis., assignor to Monson Equipment Company, Inc., Kenosha, Wis., a corporation of Wisconsin Application August 1, 1958, Serial No. 752,506

6 Claims. (Cl. 137—454.6)

This invention relates to valves, and more particularly to valves adapted for use as or in faucets and the like, being an improvement upon the structures shown in my United States Patents 2,583,869, 2,696,363 and my United States patent application Serial No. 514,819, filed June 13, 1955, for Valve.

Among the several objects of the invention may be noted the provision of an improved valve construction particularly for faucets in which a freely operable control stem operates dry within a dam, requiring no packing to prevent leakage between the interior and exterior of the valve body; the provision of a valve of the class described which is made as a conveniently replaceable cartridge unit for effecting repairs or replacements in faucet bodies and the like; the provision of a valve of the class described in which said repairs and replacements may be made with ease; and the provision of a valve of this class in which stop means for controlling on and off positions is more favorably arranged behind the dam to prevent damage thereto by rough handling in manipulating the valve. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is an axial section taken through a faucet incorporating the invention; and Figs. 2, 3, 4 and 5 are cross sections taken on lines 2—2, 3—3, 4—4 and 5—5, respectively, of Fig. 1.

Corresponding reference characters indicate corresponding parts throughout the several views of the drawings.

Referring now more particularly to the drawings, numeral 1 indicates a hollow faucet body having a threaded upstream inlet 3 and a downstream outlet spout 5. The body 1 is cored and machined, as shown at 7, to provide an inside space communicating with the spout 5. Below the space 7 is a shoulder 9 extending around a counterbore 11, the latter communicating with the inlet 3. Above the space 7, in an exteriorly threaded collar 15, is a bore 13 which extends from space 7 to the outside of the body 1. The collar 15 has threaded to it a cap 17 (see threads 18).

The bore 13, space 7 and counterbore 11 are adapted, when the cap 17 is removed, to accept with a loose sliding fit a replaceable cartridge or unit U, the parts of which will be described. This replaceable unit is constituted by a cylindrical cup 19 from which extends a nipple 21 for loose sliding insertion into the counterbore 11. This nipple is exteriorly grooved at 23 for the reception of an O ring 25 which, when the nipple 21 is inserted into the counterbore 11, produces a peripheral seal. The groove 23 is wider than the width of the O ring when free, so that as the nipple 21 is inserted into opening 11, the ring has some rolling action as it is squeezed. This favors easy insertion. The nipple 21 has an upstream inlet opening 27 forming a passage between the upstream inlet 3 and the inside of the cup 19.

The inside of the cup 19 above the inlet 27 is provided with a shoulder 29, upon which rests a circular spring ring 31 having a radially disposed spring finger 33 (Fig. 5). This is formed at its central end with an upward dimple 35 for central springing engagement with a downward projection 37 of a hardened two-lobed valve member 39. The lobes are shown at 41 (Figs. 1, 4 and 5). The valve member contains an upwardly exposed central, elongate key socket 43. The top of the valve 39 is flat and engages the flat bottom of a circular hardened valve seat 45, the margin of the latter engaging a shoulder 47 within the cup 19, so as to form a liquid seal. The valve seat 45 is provided with two opposite kidney-shaped valve ports 49 adapted to be covered and uncovered by the lobes 41 of the valve 39 when the latter is rotated 90° (Fig. 4). The flat engaging surfaces of the valve 39 and seat 45 are ground and lapped with high accuracy for positive shut-off action. The upstream water pressure aids the spring finger 33 to seat the valve 39 on the upstream side of the seat 45.

In the valve seat 45 is a central hole 51. The seat is engaged circumferentially around the hole by a lower nose portion 53 of a tubular dam 55. The fit is such that a sealing engagement is effected between the end of the nose 53 and the top of the valve seat 45. The upper end of the dam 55 is flanged, as shown at 57, and provided with threads 58 for connection with the inside upper threaded end of the cup 19. The arrangement is such that when the flange 57 is threaded into the upper end of the cup 19, the nose 53 seats on the central part 51 of the seat 45, the latter in turn seating on the shoulder 47.

Openings 59 in the cup 19 above or on the downstream side of the seat 45 and below the flange 57 form a communication between the inside of the cup 19 and the space 7. When a valve 39 is turned to open position, as shown in the drawings, water may flow from the inlet 3 through passage 27, ports 49 and 59 through space 7 to the spout 5. When the valve 39 is turned at 90° to the position shown, the flow will be cut off. Either when open or closed, no water can find its way to the central space enclosed by the socket 43, hole 51 or inside of parts 53, 55 and 57.

Above the flange 57 is a shoulder 61, from which extends a tubular collar 63. This collar 63 has a first lower groove 65 for a resilient O ring 67 adapted to form a sealing engagement with the bore 13. The groove 65 is wider than the width of the O ring when free, so that as the collar 63 is inserted in the bore 13, the ring has some rolling action as it is squeezed. This favors easy insertion. The marginal portions of the groove have clearance with respect to this bore for easy sliding movement into and out of the same, as was also the case of the margins of the groove 23 and nipple 21.

In the collar 63 is a second exterior groove 69 which is interiorly slotted throughout a 90° angle, as illustrated at 71 (Fig. 3). Above the groove 69 is a shoulder 73 from which extend two positioning lugs 75 for a slidable reception in transverse notches 77, formed in the threaded end of the collar 15 (Fig. 2). Above the shoulder 61 and within the collar 63 is located an antifriction nylon or like surface-forming jacket 79. This is not a packing but a running bearing for a valve stem, having the usual running clearance required. At their upper ends, both the collar 63 and the jacket 79 are stepped, to provide a space for accepting a metal washer 81 which holds down the rotary assembly to which jacket 79 is attached. The washer 81 is in turn held down by the cap 17.

At 83 is shown a valve stem, the upper end of which is serrated, as shown at 85, for engaging in serrated opening 87 a handle 89, the handle being held in position by a screw 91. The screw is threaded into a socket 93 in the upper end of the stem 83.

The stem 83 comprises a relatively large upper end 95 within the nylon jacket 79. This part 95 and the nylon jacket are drilled, as shown in Fig. 3, springingly to receive an axially slotted spring pin 97. The slot is shown at 99. The unsprung diameter of this pin is slightly greater than the drill hole, so that when driven into the hole it is frictionally retained in position. This pin extends beyond the hole and form an outwardly extending rotary stop 101 in the 90° slot 71. The other end of the pin is within the confines of the nylon jacket 79. Since the jacket 79 is pinned to stem 83, it rotates therewith to form an antifriction bearing therefor in the collar 63. At a point in the collar 63 behind the pin in one position thereof is located an opening 103 for introducing a tool to knock out the pin, should this be required for removal of the stem.

Extending downward from the upper end 95 of the stem 83 are successively reduced portions 105 and 107, located within the tubular dam parts 53 and 55. The portion 107 extends into the central opening in the valve seat 45. Located on the end of part 107 is a key 109 which fits accurately but somewhat loosely in the key socket 43, so that when the valve stem is turned, part 109 acts as a key in opening 43 to turn the valve 39. The available movement is 90°, as determined by the action of the stop 101 in the 90° slot 71. The purpose of the somewhat less loose fit between the key 109 and the socket 43 is to allow the valve 39 to seek its own seating level under the valve seat 45 in response to central pressure from the end 35 of the finger 33. Consequently, any slight misalignment of the valve stem 83, as might be determined by the hold-down action of the cap 17 on jacket 79, will not affect the excellent sealing properties effective between the moving valve 39 and its seat 45.

If any defects appear requiring repairs, the handle 89 may be removed by removing screw 91 and then the cap 17 unthreaded. The splined end 85 of the stem 83 may then be grasped and pulled upward, which removes the cartridge assembly of parts 19 and 63, and the operating parts contained therein. A new assembly may then be inserted into the faucet body 1, the lugs 75 of the new assembly being located in the notches 77. Then the cap 17 may be replaced, which by contact at the parts adjacent washer 81, presses the assembly to a seat on shoulder 9. The new O rings 25 and 67 effect peripheral seals. By this means, rapid faucet repairs may be accomplished in the field. Then the removed assembly of parts may be opened for shop repairs therein. In the latter case, the part indicated by numerals 53, 55, 57, 65, 63 may be unthreaded from the cup 19 and whatever replacements are required may be made. In general, however, an entire unit or cartridge is of sufficiently low cost that repairs inside of the cartridge are unwarranted.

It will be understood that when it is contemplated that repairs shall only be made by cartridge replacement rather than by repair of parts within the cartridges, a pressed, soldered or other permanent connection may be made at the threads 58.

It will also be clear that the part 95 of the stem 83 could be enlarged to supplant the nylon jacket 79, but it is preferred to employ the jacket because it minimizes squeaking upon rotation of the stem.

Advantages of the faucet are:

(1) The compactness of the operating elements and their organization as a replaceable cartridge for easy application to and removal from the faucet body in a keyed position, as determined by the lugs 75, the same being automatically sealed by the O rings 25 and 67 when pressed home.

(2) The protected dry location of the stem 83 within the dam parts, precluding access of water to the opening required for extending the valve stem from the inside of the cartridge to the outside handle 89. The result is the need only for a mere rotary bearing between the jacket 79 and the collar 63, rather than the usual compressed packing. This results in a much easier turning of the handle. Note in this connection that the washer 81 is in nowise a packing but simply a bearing means.

(3) The ease with which the removable assembly may be inserted and withdrawn by reason of the comparatively loose fit between it and the inside portions of the faucet, taken up by the O rings 25 and 67, which tend to roll into place and form the final seal when the cartridge is inserted.

(4) The form of the rotary stop means consisting of the pin 97 and slot 71 operative on a comparatively large radius in a raised position above the dam parts. This favors a long trouble-free life of these parts.

(5) The smooth and easy operation of the faucet because of the absence of compressed packing means.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A valve construction comprising a body having a hollow interior connected with an upstream inlet and a downstream outlet and formed with engageable portions on opposite sides of the outlet, a unit adapted to be moved from the outside of the body into said engageable portions and having sealing means engaging therewith on opposite sides of said outlet, said unit being hollow and having a connection from its inside to said hollow interior of the body, a valve seat in the unit on the upstream side of said connection, a rotary valve on the upstream side of the seat, means biasing said valve toward the seat, said unit including an inside tubular portion sealingly engaging the seat on its side opposite the valve to form a dam extending from the seat, an extension from the dam adapted to form a bearing, and a valve control stem extending through said bearing, dam and seat and having a loose keyed connection with said valve.

2. A valve construction comprising a body having a hollow interior connected with an upstream inlet and a downstream outlet and formed with cylindrical portions on opposite sides of the outlet, a cylindrical unit assembly adapted to slide into said cylindrical portions and having sealing means engageable therewith on opposite sides of said outlet, said unit being hollow and having a connection from its inside to said hollow interior of the body, a ported valve seat in the unit on the upstream side of said connection, a port-controlling rotary valve on the upstream side of the seat, a spring biasing said valve toward the inlet side of the seat, said unit including an inside tubular portion sealingly engaging the seat on its side opposite the valve to form a dam extending from the seat, an extension from the dam adapted to form a bearing, a valve stem extending through said bearing, dam and seat and having a loose keyed connection with said valve, a slot in said bearing, and a pin extending from the stem and into said slot, the movement of the pin being limited by the slot so as to limit correspondingly the movement of the valve to open and closed positions relative thereto.

3. A valve construction for a body having a hollow interior connected with an upstream inlet and a downstream outlet and formed with cylindrical portions on opposite sides of the outlet, a unit assembly having cylindrical ends adapted to slide loosely into said cylindrical portions, said ends having O-ring sealing means engageable with the cylindrical ends on opposite sides of said outlet, said unit being cylindrically hollow and having transverse holes extending from its inside to said hollow interior of the body, a ported valve seat in the unit, a port-controlling rotary valve on the upstream side of the seat, a spring biasing said valve toward the inlet side of the seat, said unit including an inside tubular portion sealingly engaging the seat within its ported portion and on its side opposite the valve to form a dam extending from the seat, an extension from the dam adapted to form a bearing, a valve stem extending through said bearing, dam and seat and having a loose keyed connection with said valve, a slot in the bearing above said dam, a pin extending from the stem and into said slot, the movement of the pin being limited by said slot so as to limit correspondingly the movement of the valve, and a cap threaded to said body and adapted to hold said unit in sealing position in said body.

4. A valve construction comprising a hollow body having an inlet, a circular shoulder therein, the hollow portion of the body forming an inner space connected with an outlet, said hollow portion also having a passage concentric with the shoulder and extending from the shoulder to the outside, a unit assembly replaceable in the body comprising a cup adapted to rest on the shoulder and having a nipple surrounded by packing adapted to be inserted within the shoulder to effect an adjacent seal, a concentric bearing and dam member attached to the cup, said member being surrounded by a second packing adapted to form a seal in said concentric passage, a valve seat in the cup having port means therein, a rotary valve under the seat controlling its port means, spring means biasing said valve against the seat, said bearing and dam member having a bearing portion and a tubular dam portion sealingly engaging the seat radially within the port means to form a dam, said cup having outlets from the space between it and the dam and extending to said inner space, a valve stem extending through the bearing and dam portions of said bearing and dam member, the stem passing through said seat and having a loose keyed connection with said valve, a slot in said bearing portion above the dam, a pin extending from the stem and into said slot, the movement of the pin being limited by said slot so as to limit correspondingly the movement of the valve relative to the seat, and a cap attached to said body and adapted to hold the unit in engagement with the shoulder of the faucet body.

5. A faucet valve construction according to claim 4, wherein the part of the stem adjacent the pin is surrounded by an antifriction sleeve which is attached to the stem by said pin for rotation with the stem.

6. A faucet valve construction according to claim 5, wherein said sleeve is provided with an opening unoccupied by said pin adapted for reception of means for removing the pin.

No references cited.